United States Patent
Dejanovic

(10) Patent No.: US 11,075,854 B2
(45) Date of Patent: Jul. 27, 2021

(54) SYSTEM FOR REDUCING LATENCY IN NETWORK DEVICES

(71) Applicant: METAMAKO GENERAL PTY LTD IN ITS CAPACITY AS GENERAL PARTNER OF METAMAKO TECHNOLOGY LP, Sydney (AU)

(72) Inventor: Thomas Dejanovic, Sydney (AU)

(73) Assignee: Arista Networks, Inc., Santa Clara, CA (US)

(*) Notice: Subject to any disclaimer, the term of this patent is extended or adjusted under 35 U.S.C. 154(b) by 0 days.

(21) Appl. No.: 16/754,273

(22) PCT Filed: Oct. 17, 2018

(86) PCT No.: PCT/AU2018/000201
§ 371 (c)(1),
(2) Date: Apr. 7, 2020

(87) PCT Pub. No.: WO2019/075506
PCT Pub. Date: Apr. 25, 2019

(65) Prior Publication Data
US 2021/0006508 A1 Jan. 7, 2021

(30) Foreign Application Priority Data
Oct. 17, 2017 (AU) ................................ 2017904207

(51) Int. Cl.
*H04L 12/933* (2013.01)
*H04L 12/931* (2013.01)

(52) U.S. Cl.
CPC ............ *H04L 49/10* (2013.01); *H04L 49/351* (2013.01)

(58) Field of Classification Search
CPC .............................. H04L 49/10; H04L 49/351
See application file for complete search history.

(56) References Cited

U.S. PATENT DOCUMENTS

| 7,007,208 B1 | 2/2006 | Hibbert et al. |
| 7,304,996 B1 | 12/2007 | Swenson et al. |
| 7,823,162 B1 | 10/2010 | Keller et al. |
| 8,832,366 B1* | 9/2014 | Huynh ............... G06F 12/0804 711/113 |
| 2003/0208709 A1* | 11/2003 | Kassa .................. H04J 3/0608 714/735 |
| 2005/0058187 A1 | 3/2005 | Groen et al. |

(Continued)

OTHER PUBLICATIONS

International Search Report and Written Opinion issued in corresponding Application No. PCT/AU2018/000201, dated Feb. 22, 2019 (8 pages).

*Primary Examiner* — Christine Ng
(74) *Attorney, Agent, or Firm* — Chamberlain, Hrdlicka, White, Williams & Aughtry

(57) ABSTRACT

In general, the invention relates to a gearbox. The gearbox may include a controller comprising circuity and is configured to make a first determination that an available data amount at a first clock cycle is greater than a required data amount and that no idle Ethernet Block is being processed, wherein the available data amount at the first clock cycle comprises an unaligned data word, based on the first determination, generate a first aligned data word comprising at least a portion of the unaligned data word, and transmit the first aligned data word to a transmit port.

20 Claims, 6 Drawing Sheets

(56) References Cited

U.S. PATENT DOCUMENTS

| | | | |
|---|---|---|---|
| 2007/0253430 A1 | 11/2007 | Minami et al. | |
| 2013/0083810 A1* | 4/2013 | Ghiasi | H04L 25/49 |
| | | | 370/535 |
| 2015/0121021 A1* | 4/2015 | Nakamura | G06F 3/0659 |
| | | | 711/159 |

* cited by examiner

SYSTEM FOR REDUCING LATENCY IN NETWORK DEVICES

BACKGROUND

In various networking environments, network devices receive data from high speed transceivers on ingress ports, process the data, and then transmit the processed data on egress ports. The aforementioned processing typically involves performing a function on the incoming data to match an internal data width that is supported by the network device. Further, after the data have been processed by the network device, the processed data needs to be reconvert to the data width supported by the data transfer protocol (e.g., Ethernet). The conversion to the internal data width and is performed by a first gearbox and the subsequent reconversion back to the protocol data width is typically performed by a second gearbox. The use of the two gearboxes results in latency being incurred on both ingress and egress of the data.

SUMMARY

In general, in one aspect, the invention relates to a gearbox. The gearbox includes a controller comprising circuity and configured to: make a first determination that an available data amount at a first clock cycle is greater than a required data amount and that no idle Ethernet Block is being processed, wherein the available data amount at the first clock cycle comprises an unaligned data word, based on the first determination, generate a first aligned data word comprising at least a portion of the unaligned data word, and transmit the first aligned data word to a transmit port.

In general, in one aspect, the invention relates to a system. The system includes a first transmit port, a sampled word processor and a gearbox, interposed between the sample word processor and the transmit port. The gearbox includes circuity and is configured to: make a first determination that an available data amount at a first clock cycle is greater than a required data amount and that no idle Ethernet Block is being processed, wherein the available data amount at the first clock cycle comprises an unaligned data word, wherein the unaligned data word is received from the sampled word processor, based on the first determination, generate a first aligned data word comprising at least a portion of the unaligned data word, and transmit the first aligned data word to a transmit port.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to processing unaligned data words to generate aligned data words using a gearbox. More specifically, embodiments of the invention relate to eliminating a gearbox on an ingress path and using a gearbox on the egress path to generate aligned data words, which are subsequently transmitted towards a destination as part of an Ethernet Stream. By eliminating the gearbox on the ingress path, embodiments of the invention decrease the latency related to processing the received Ethernet Stream and also decrease the latency related to generating the aligned data words to be included in the transmitted Ethernet Stream.

Figure 1A:
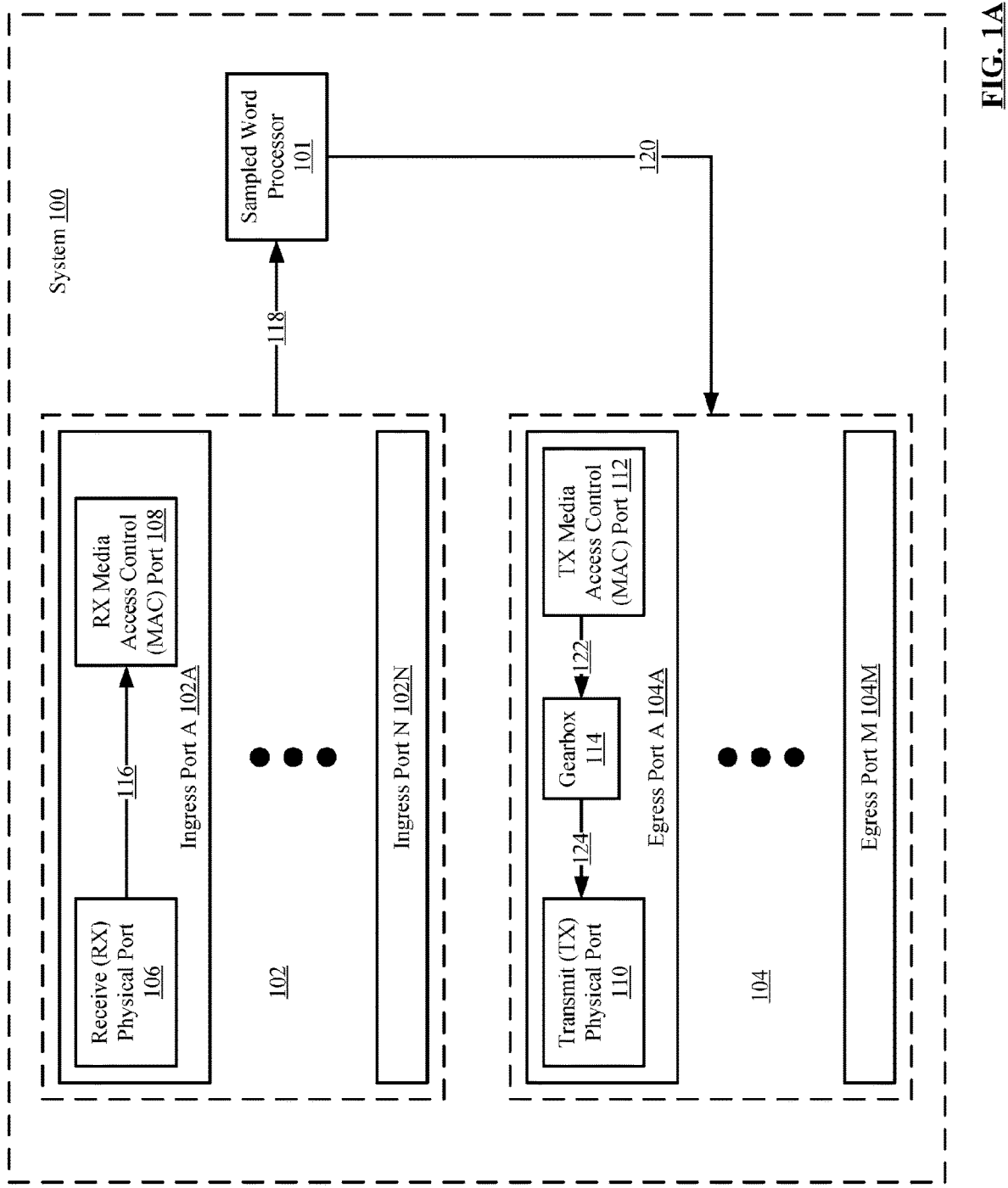
FIG. 1A shows a system in accordance with one or more embodiments of the invention.

FIG. 1A shows a system in accordance with one or more embodiments of the invention. In one embodiment of the invention, the system is or is part of a network device. In one or more embodiments of the invention, a network device may be a physical device that includes, but is not limited to, all or any subset of the following: persistent storage (not shown), memory (e.g., random access memory (RAM)) (not shown), one or more processor(s) (not shown), one or more network chips, one or more circuit components (e.g., wire, resistors, capacitors, transistors, inductors, integrated circuitry packages, printed circuit boards, diodes, comparators, etc.), one or more field programmable gate arrays (FPGAs), one or more application specific integrated circuits (ASICs), one or more complex programmable logic devices (CPLDs) and two or more physical interfaces. A network device may be connected to other devices via the aforementioned physical interfaces (which may be wired or wireless interfaces).

In one or more embodiments of the invention, a network device includes functionality to receive Ethernet Blocks at any of the physical interfaces (i.e., ports) of the network device, process the Ethernet Blocks, and subsequently transmit, the processed Ethernet Blocks from any of the physical interfaces of the network device. Examples of network devices include, but are not limited to, a network switch and/or a multi-layer network switch. While the system may be implemented as or in a network device, the system is not limited to being implemented as or in a network device.

Turning to the system, the system (100) includes one or more ingress ports (102A, 102N), a sampled word processor (101), and one or more egress ports (104A, 104M). The system (100) may include other components without departing from the invention. For example, the system may include one or more buffers interposed between the ingress ports (102) and the sampled word processor (101) as well as one or more buffers interposed between the sampled word processor (101) and the egress ports (104). Further, ingress ports (102) and the egress ports (104) may be connected to a crossbar switch (not shown).

In one embodiment of the invention, each ingress port (102A, 102N) includes a receive (RX) physical port (106) (also referred to as a receive port) and a RX media access control (MAC) port (108). The RX physical port (106) is configured to receive serialized Ethernet Blocks (also referred to as an Ethernet Stream) and sample (or process) the serialized Ethernet Blocks to obtain sampled data words, which are unaligned data words. The sampled data words are then transmitted, via a bus (116), to the RX MAC port (108). In one embodiment of the invention, the size of the sampled data word matches the width of the bus (116). For example, if the width of the bus (116) is 32 bits, then the sampled data words that are transmitted on the bus (116) are 32 bits. Thus, the sampling (or processing) of the serialized Ethernet Stream by the RX physical port is configured such that the resulting sampled data words are of the appropriate size to transmit on the bus (116).

Figure 3:
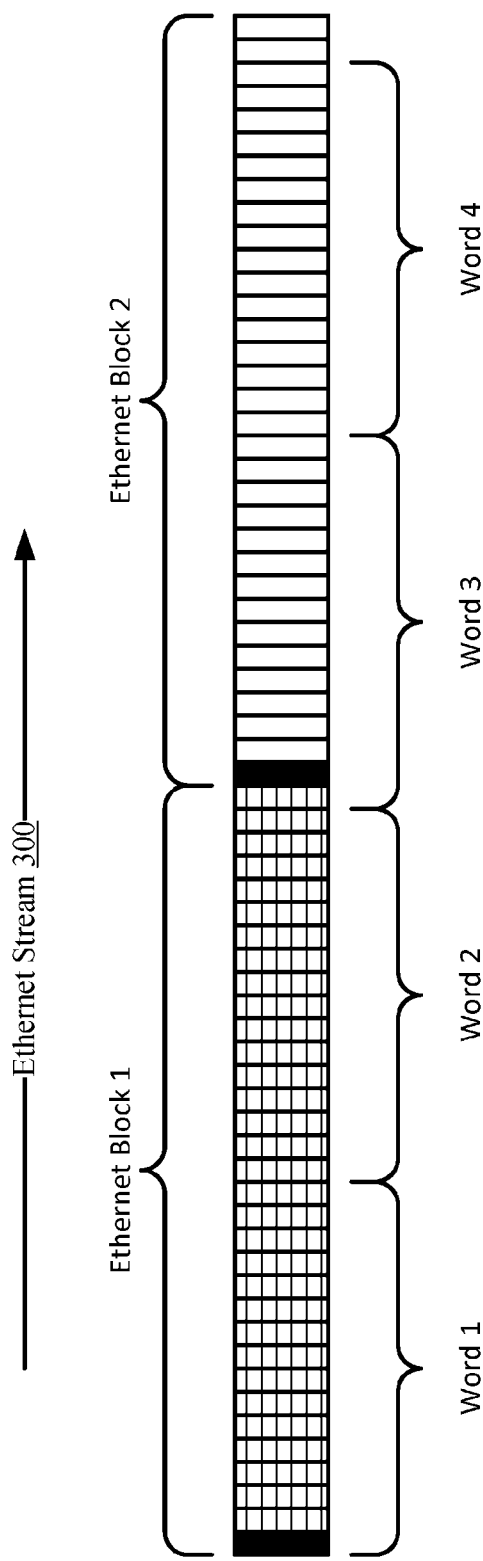
FIG. 3 shows an example of sampling Ethernet Blocks in accordance with one or more embodiments of the invention.

In one embodiment of the invention, the Ethernet Blocks each have a length of 66 bits, namely, two sync bits and 64 data bits while the width of the bus (116) and, as a result, the size of the sampled data words is 32 bits. Accordingly, because 66 bits is not a multiple of 32, the content of each of the sampled data words may vary. For example, some of the sampled data words will include sync bits and data bits while other sampled data words will only include data bits (i.e., no sync data). Further, if the sampled data word includes sync bits, the location of the sync bits will vary between the sampled data words. An example of a sampled Ethernet Stream is shown in FIG. 3.

Continuing with the discussion of FIG. 1A, RX MAC port (108) is configured to receive the sampled data words, via the bus (116), and determine whether the sampled data words include noise or valid data. If the sampled data word includes valid data, then it is transmitted via a bus (118) to the sampled word processor (101); otherwise, the sampled data word is discarded or otherwise not transmitted to the sampled word processor (101).

In one embodiment of the invention, the sampled word processor (101) is configured to received sampled data words from the ingress ports (102) and process the received sampled data words. The processing by the sampled word processor (101) may include performing a function, where the function may include, but it not limited to, switching (or a switching function) and aggregation (or an aggregation function). In one embodiment of the invention, switching involves receiving a sampled data word from an ingress port, identifying an egress port to which to send the sampled data word, and then transmitting the sampled data word to the identified egress port. In one embodiment of the invention, aggregation involves transmitting sampled data words receiving from two or more ingress ports to a single egress port. For example, if the sampled word processor is performing an aggregation function, then sampled data words received from ingress ports 1, 2, and 3 are transmitted to a single egress port, e.g., egress port 2.

Continuing with the discussion of FIG. 1A, after the sampled data words are processed, they are then transmitted on a bus (120) to the appropriate egress port (104). The specific egress port to which a given sampled data word is transmitted is based on the processing of the sampled data word by the sampled word processor (101).

In one embodiment of the invention, each egress port (104A, 104M) includes a transmit (TX) physical port (124) (also referred to as a transmit port), a gearbox (114), and a TX MAC port (112).

The TX MAC port (112) is configured to receive sampled data words from the sampled word processor (101) and determine whether the sampled data words include noise or valid data. If the sampled data words include valid data, then they are transmitted to the gearbox (114) via a bus (122); otherwise, the sampled data words are discarded or otherwise not transmitted to the gearbox (114).

The gearbox (114) is configured to receive the sampled data words, which are unaligned data words, from the TX MAC port (112) and then process the sampled data words to generated aligned data words. The aligned data words are then transmitted to the TX physical port (110) via a bus (124). The aligned data words are generated such when they are serialized by the TX physical port (110), the result is an Ethernet Stream (i.e., serialized data that includes 66-bit segments, where each segment includes two bits of sync data followed by 64 bits of data. Additional detail about the architecture and operation of the gearbox (114) is provided in FIG. 1B and FIG. 2.

Continuing with the discussion of FIG. 1A, the TX physical port (110) is configured to receive the aligned data words and then generate serialized data. The serialized data is then transmitted from the TX physical port. In one embodiment of the invention, the serialize data is part of an Ethernet Stream. Said another way, the serialized data that is transmitted from the TX physical port is an Ethernet Stream that is generated by serializing the aligned data words received from the gearbox.

In one embodiment of the invention, each unaligned and aligned data word is 32 bits. Further, each bus (e.g., 116, 118, 120, 122, 124) on which the aligned or unaligned data words are transmitted have a width that is equal to 32 bits. The invention is not limited to 32-bit data words and/or buses with a width of 32 bits; rather, the invention may be implemented using any bus width provided that the other RX physical port (106) samples the Ethernet Blocks to generate words that have a width that matches the width of the buses.

In one embodiment each ingress port (102A, 102N) and each egress port (104) may be implemented using circuity. For example, the ingress ports and egress ports may be implemented in an field-programmable gate array (FPGA) or in an application-specific integrated circuit (ASIC). In one embodiment of the invention, all the ingress ports (102) are implemented on single FPGA or ASIC and all egress ports (104) are implemented on a single FPGA or ASIC. In this scenario, there are at least two FPGAs or ASICs in the system, one on which ingress ports are implemented and one on which the egress ports are implemented. In another embodiment of the invention, there is a single FPGA or ASIC on which the ingress ports (102) and the egress ports (104) are implemented.

In one embodiment of the invention, the sampled word processor (101) may be implemented using circuity. For example, sampled word processor (101) may be implemented in an FPGA or in an ASIC. The sampled word processor (101) may be implemented on an FPGA or ASIC that is separate from the FPGA(s) or ASIC(s) on which the ingress ports and egress ports are implemented. Alternatively, the sampled word processor (101) may be implemented on an FPGA or ASIC that is also implementing the ingress ports and/or egress ports. Other architectures may be implemented without departing from the invention.

Figure 1B:
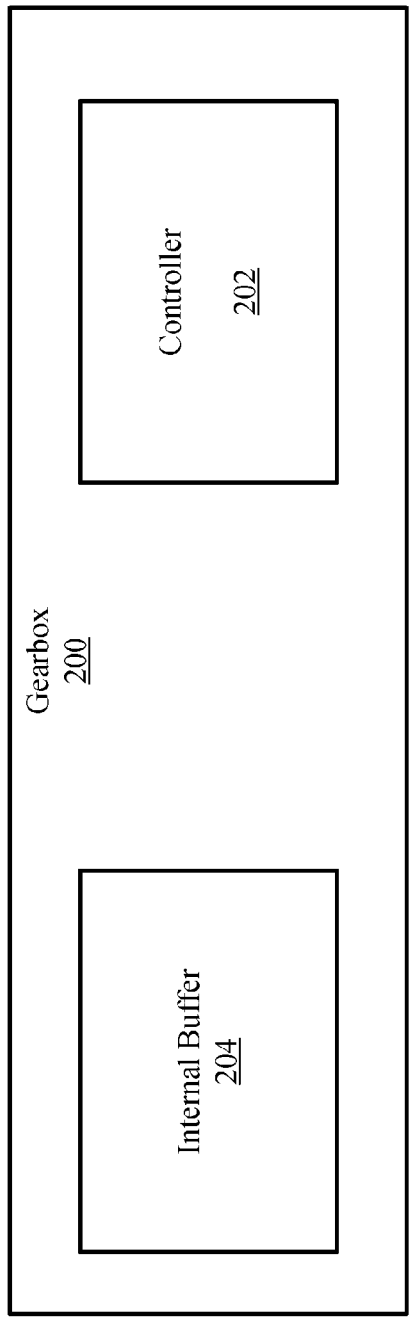
FIG. 1B shows a gearbox in accordance with one or more embodiments of the invention

FIG. 1B shows a gearbox in accordance with one or more embodiments of the invention. The gearbox (200) includes a controller (202) and an internal buffer (204). The controller (202) may be implemented in circuitry. For example, the controller (202) may be implemented in an FPGA or an ASIC. The controller (202) is configured to generate aligned data words using unaligned data words received from the sampled word processor and any unaligned data words (or portions thereof) stored in the internal buffer (204) of the gearbox (200). In one embodiment of the invention, the controller generates an aligned data word at each clock cycle. The internal buffer (204) includes volatile memory that, in one embodiment of the invention, stores an amount of data that is equal to up to two data words. For example, if a data word is 32 bits, then the internal buffer may store up to 64 bits of data.

In scenarios in which there is an insufficient amount of available data in a given clock cycle to generate an aligned data word, the gearbox (114) also includes functionality to generate and transmit an idle Ethernet Block. In one embodiment of the invention, the idle Ethernet Block is 66 bits in length (including two sync bits and 64 bits of idle Ethernet data). The idle Ethernet data is generated by the gearbox in order to ensure that the gearbox is outputting, on each clock cycle, an aligned data word. The idle Ethernet data may be considered noise by a receiving system and, as such, discarded or otherwise not processed by the receiving system. Additional detail about the operation of the gearbox is provided in FIG. 2.

Figure 2:
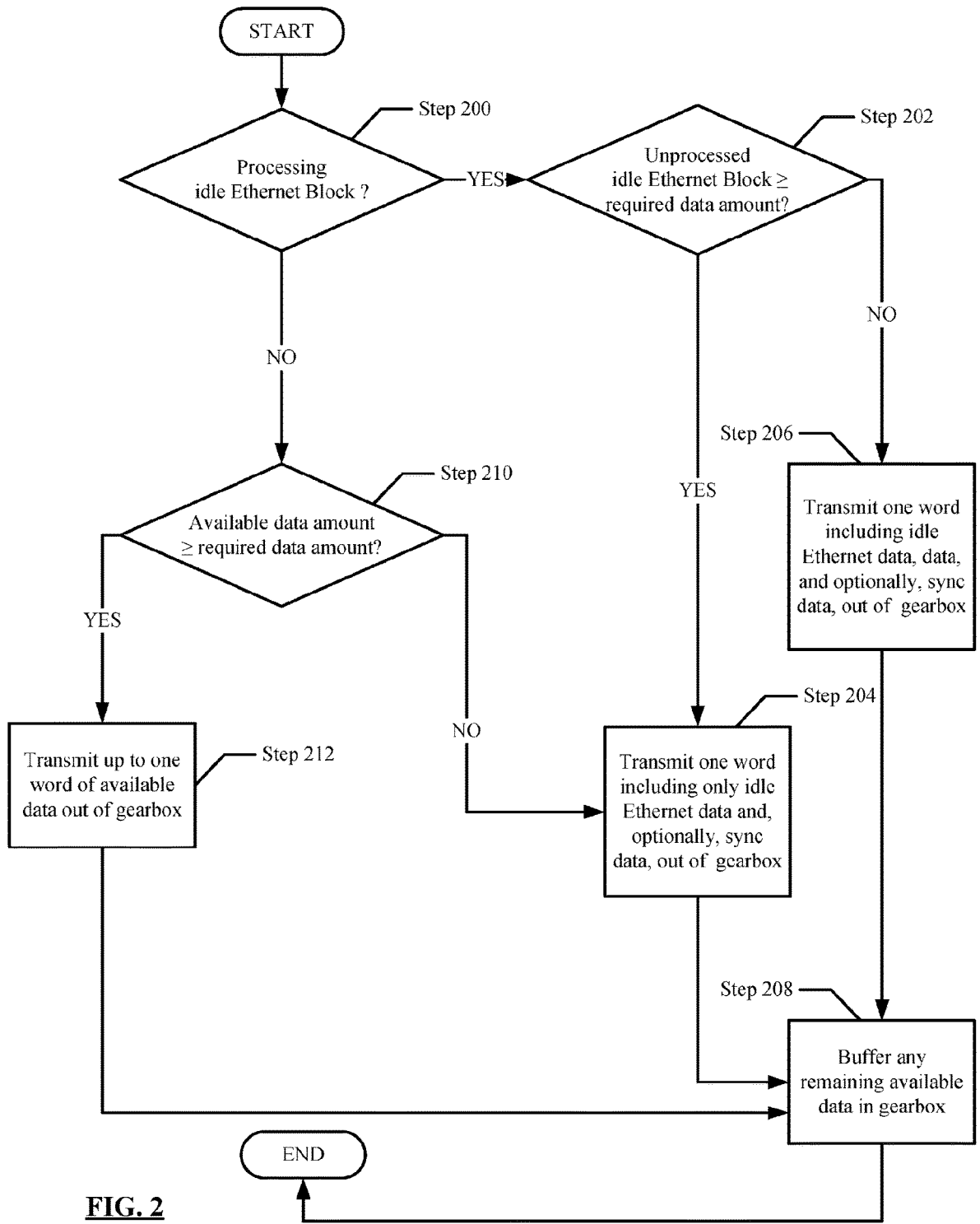
FIG. 2 shows the gearbox controller logic in accordance with one or more embodiments of the invention.

FIG. 2 shows the gearbox controller logic in accordance with one or more embodiments of the invention. While the various steps in the flowchart are presented and described sequentially, one of ordinary skill in the relevant art will appreciate that some or all of the steps may be executed in different orders, may be combined or omitted, and some or all steps may be executed in parallel.

The method shown in FIG. 2 is performed by the gearbox at each clock cycle. Turning to FIG. 2, in Step 200, a determination is made about whether the gearbox is currently processing an idle Ethernet Block. If the gearbox is currently processing an idle Ethernet Block, then the process proceeds to step 202; otherwise, the process proceeds to step 210.

As discussed above, at each clock cycle, the gearbox outputs an aligned data word. If at a given clock cycle, there is in sufficient amount of available data to create a aligned data word (e.g., a 32-bit aligned data word), then the gearbox initiates the transmission of an idle Ethernet Block. If the idle Ethernet Block is 66 bits, then the processing of an idle Ethernet Blocks takes three clock cycles assuming that the aligned data words each have 32 bits). If unaligned data words (or portions thereof) are received during the first two of the three aforementioned clock cycles, then such received data is buffered while the idle Ethernet Block is transmitted out of the gearbox as an aligned data word. Accordingly, the determination in step 200 relates to whether any portion of the 66 bits of the idle Ethernet Block is remaining to be transmitted out of the gearbox.

Continuing with the discussion of FIG. 2, in Step 202, a determination is made about whether the amount of the unprocessed idle Ethernet Block is greater than or equal to the required data amount. If the unprocessed idle Ethernet Block is greater than or equal to the required data amount, the process proceeds to step 204; otherwise, the process proceeds to step 206.

In one embodiment of the invention, the required data amount for a given clock cycle may vary based on whether or not sync bits are required to be inserted into the aligned data word that is being generated by the gearbox during the clock cycle. Specifically, as discussed above, the gearbox is configured to generate an aligned data word at each clock cycle. The aligned data word may include either: (i) only data (which may be idle Ethernet data or data received from the sampled word processor) or (ii) data (which may be idle Ethernet data or data received from the sampled word processor) and sync data.

In one embodiment of the invention, because the Ethernet Blocks include two bits of sync data followed by 64 bits of data (which may be idle Ethernet data or data received from the sampled word processor), the gearbox will insert two bits of sync data after 64 bits of data (which may be idle Ethernet data or data received from the sampled word processor). Accordingly, if the aligned data word is 32 bits, then at any given clock cycle the required data amount is up to 32 bits of data, with the exact required data amount being dependent on whether sync data and/or idle Ethernet data is to be included in the aligned data word.

Continuing with the discussion of FIG. 2, in Step 204, because remaining amount of the idle Ethernet Block to process is greater than or equal to the required data amount, then the gearbox generates an aligned data word that includes either: (i) only idle Ethernet data or (ii) idle Ethernet data and sync data. The process then proceeds to step 208.

In Step 206, because remaining amount of the idle Ethernet Block to process less than the required data amount, then the gearbox generates an aligned data word that includes idle Ethernet data (i.e., the last portion of the 66 bits of the idle Ethernet Block), sync data, and an amount of data received from the sampled word processor (where the amount of data is equal to the size of the aligned data word minus: (i) the number of bits of idle Ethernet data and (ii) the number of bits of sync data). The process then proceeds to step 208.

In Step 208, any data received during the clock cycle from the sampled word processor that is not included as part of the aligned data word that is generated by the gearbox during the clock cycle is stored in the internal buffer. The process then ends.

Returning to Step 200, when the gearbox is not processing an idle Ethernet Block, then in Step 210, a determination is made about whether an available data amount is greater or equal to a required data amount. If the available data amount is less than the required data amount, then the process proceeds to step 204; otherwise the process proceeds to step 212.

When the process goes from step 210 to 204, the gearbox initiates the processing of an idle Ethernet Block. Accordingly, when the gearbox performs step 204 after step 210, the aligned data word that is generated and transmitted during the clock cycle includes sync data followed by idle Ethernet data.

Continuing with the discussion of Step 210, in one embodiment of the invention, the available data amount is the combination of: (i) an amount of data received from the sampled word processor during the clock cycle and (ii) any data currently stored in the internal buffer of the gearbox.

As discussed above, the required data amount for a given clock cycle may vary based on whether or not sync bits are required to be inserted into the aligned data word that is being generated by the gearbox during the clock cycle. Accordingly, the required data amount may be either: (i) the number of bits in an aligned data word that the gearbox is required to generate during the clock cycle or (ii) the number of bits in an aligned data word that the gearbox is required to generate during the clock cycle less the number of bits of sync data that the gearbox is required to include in the aligned data word it is generating during the clock cycle.

Returning to step 210, when available data amount is greater or equal to a required data amount, then in Step 212, all of the data in the internal buffer (if any) plus at least a portion of the data received from the sampled word processor during the clock cycle is included in the aligned data word that is generated and transmitted during the clock cycle. In this manner, at least a portion of the data received from the sampled word processor during the clock cycle is received and transmitted within the clock cycle, thereby incurring no latency. The process then proceeds to step 208.

When the process goes from step 212 to 208, the gearbox buffers any data received from the sampled word processor during the clock cycle that was not included within the aligned data word that was generated and transmitted during the clock cycle.

EXAMPLES

The following text and accompanying figures illustrate various embodiments of the invention. The examples are included to highlight various aspects of the invention; however, the examples are not intended to limit the scope of the invention.

Turning to FIG. 3, FIG. 3 shows an example of sampling Ethernet Blocks in accordance with one or more embodiments of the invention. More specifically, FIG. 3 shows how an Ethernet Stream (300) is sampled by a receive port (e.g., FIG. 1, 106). Specifically, in this example, each Ethernet Block (Ethernet Block 1 and Ethernet Block 2) is 66 bits and each sampled data word (i.e., Word 1, Word 2, Word 3, Word 4) is 32 bits. Because the size of the Ethernet Block is not a multiple of the size of the sampled data words, the content of each of the sampled data words varies. For example, Word 1 includes two sync bits and 30 data bits, while Word 2 includes 32 bits of data. Further, for sampled data words that include sync bits, the location of the sync bits varies. For example, the location of the sync bits (denoted using a solid rectangle) is different than the location of the sync bits in Word 3.

Figure 4:
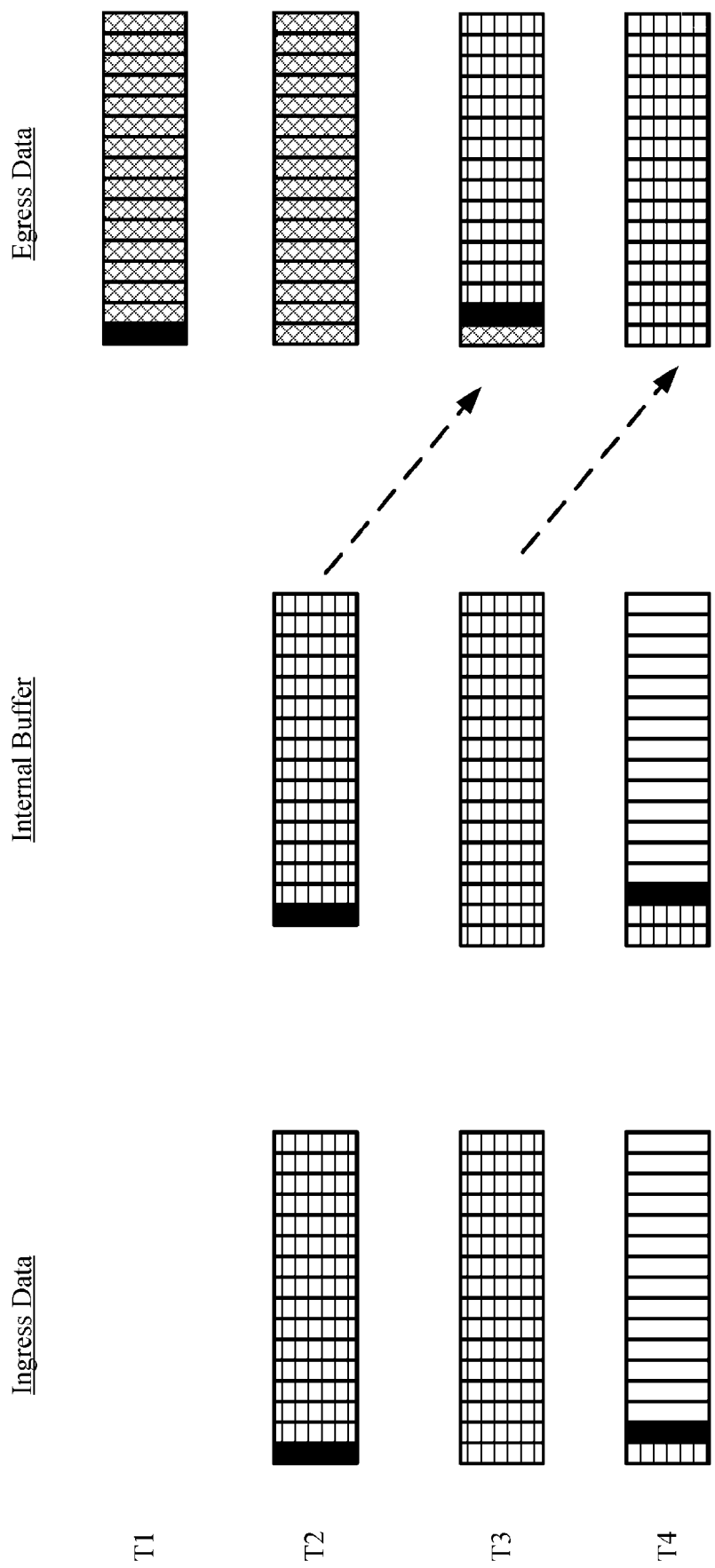
FIG. 4 shows an example of the operation of the gearbox in accordance with one or more embodiments of the invention.

Turning to FIG. 4, FIG. 4 shows an example of the operation of the gearbox in accordance with one or more embodiments of the invention. Specifically, FIG. 4 shows the operation (as described in FIG. 2) of the gearbox over four clock cycles (i.e., clock cycle T1, T2, T3, and T4).

At T1, a determination is made that the amount the available amount of data (i.e., data in the internal buffer and ingress data (i.e., data received from the sampled word processor at T1)) is less than 32 bits (i.e., the required data amount in this example). As a result, the gearbox initiates the transmission of a 66-bit Ethernet Block. This results in the gearbox transmitting an aligned data word that includes two bits of sync data and 30 bits of idle Ethernet data (see Egress Data for T1).

At T2, the gearbox is still processing the 66-bit Ethernet Block and, as such, the data received at T2 from the sampled word processor is buffered in the internal buffer. Further, the aligned data word that is transmitted during T2 includes only idle Ethernet data (see Egress Data for T2). At this stage, 64 bits of the 66 bits of the Ethernet Block have been processed.

At T3, because there are still two bits of idle Ethernet data to process, the aligned data word includes the two bits of Ethernet data. Further, because the available data amount at T3 (i.e., data in the internal buffer and ingress data (i.e., data received from the sampled word processor at T3)) is greater than the required data amount (i.e., 28 bits), the aligned data word generated at T3 includes two bits of idle Ethernet data, two sync bits, and 28 bits of data. In this example, the 28 bits of data includes the data in the internal buffer. The remaining data in the internal buffer that is in excess of the 28 bits of data remains in the internal buffer. Further, any received data (i.e., the Ingress Data at T3) is also stored in the internal buffer.

At T4, because the available data amount at T4 (i.e., data in the internal buffer and ingress data (i.e., data received from the sampled word processor at T4)) is greater than the required data amount (i.e., 32 bits), the aligned data word generated at T4 includes 32 bits of data. In this example, the 32 bits of data includes the data in the internal buffer. The remaining data in the internal buffer that is in excess of the 32 bits of data remains in the internal buffer. Further, any received data (i.e., the Ingress Data at T4) is stored in the internal buffer.

Figure 5:
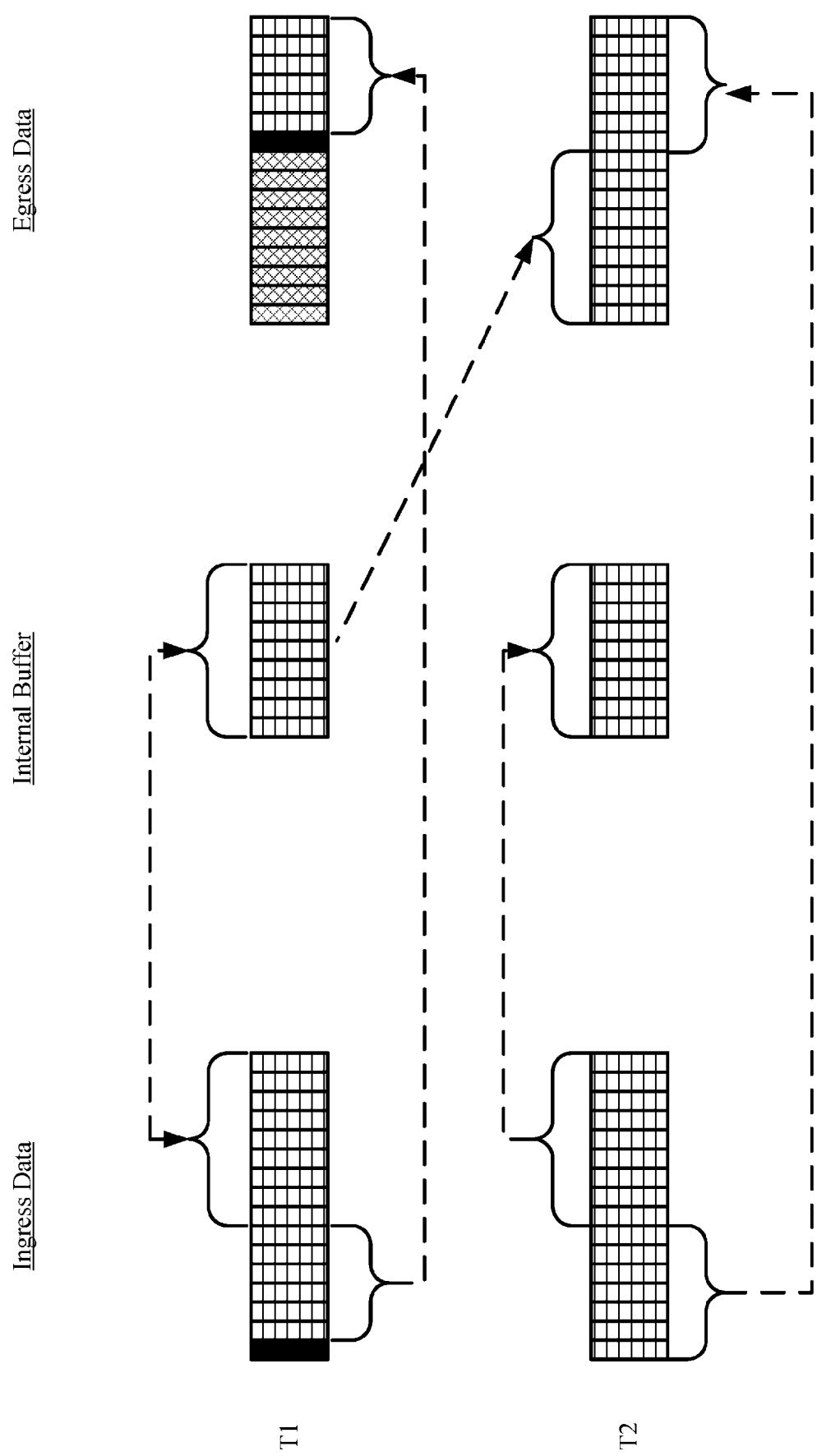
FIG. 5 shows another example of the operation of the gearbox in accordance with one or more embodiments of the invention.

FIG. 5 shows another example of the operation of the gearbox in accordance with one or more embodiments of the invention. Specifically, FIG. 5 shows the operation (as described in FIG. 2) of the gearbox over two clock cycles (i.e., clock cycle T1 and T2).

At T1, the gearbox is still processing a remaining portion of an idle Ethernet Block (500). Because there are still 18 bits of idle Ethernet data to process, the aligned data word includes the 18 bits of Ethernet data. Further, because the available data amount at T1 (i.e., ingress data (i.e., data received from the sampled word processor at T1)) is greater than the required data amount (i.e., 14 bits), the aligned data word generated at T1 includes 18 bits of idle Ethernet data, two sync bits, and 12 bits of data. In this example, the 12 bits of data includes the data received during T1 and, as such, for these 12 bits of data there is no latency. Said another way, the 12 bits of data are received and transmitted during the same clock cycle. The remaining received data in excess of the 12 bits of data is stored in the internal buffer.

At T2, because the available data amount at T2 (i.e., data stored in the internal buffer and the ingress data (i.e., data received from the sampled word processor at T2)) is greater than the required data amount (i.e., 32 bits), the aligned data word generated at T2 includes 32 bits of data. In this example, the 14 bits of the 32 bits of data includes the data received during T2 and, as such, for these 14 bits of data there is no latency. Said another way, the 14 bits of data are received and transmitted during the same clock cycle. The remaining received data in excess of the 14 bits of data is stored in the internal buffer.

End of Example

Various embodiments of the invention reduce latency for the processing of data by a gearbox. Specifically, embodiments of the invention reduced the number of required gearboxes from two gearboxes (i.e., one in the ingress port and one on the egress port) to one gearbox (i.e., only one gearbox on the egress port). Further, the gearbox, according, to one or more embodiments of the invention, reduces the latency related to the processing data received by the gearbox. In particular, in certain scenarios (see e.g., FIG. 5), at least a portion of the data received by the gearbox experiences no latency. The reduction (and in some cases elimination) of latency for data being processed by the gearbox improves the technical operation of the system and, as a result, the overall performance of the system.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A gearbox, comprising:
 a controller comprising circuitry and configured to:
  make a first determination that an available data amount at a first clock cycle is greater than a required data amount and that no idle Ethernet Block is being processed, wherein the available data amount at the first clock cycle comprises an unaligned data word;
  based on the first determination, generate a first aligned data word comprising at least a portion of the unaligned data word; and
  transmit the first aligned data word to a transmit port.

2. The gearbox of claim 1, wherein the controller is further configured to:
 make a second determination that an available data amount at a second clock cycle is less than the required data amount; and
 based on the second determination, initiate transmission of an idle Ethernet Block.

3. The gearbox of claim 2,
 an internal buffer:
 wherein the controller is further configured to:
  make, at a third clock cycle, a third determination that the idle Ethernet Block is being processed;
  make a fourth determination that a remaining amount of the idle Ethernet Block to process is greater than the required data amount; and
  based on the third and fourth determinations:
   transmit a second aligned data word consisting of: (i) idle Ethernet data or (ii) idle Ethernet data and sync data; and
   buffer any portion of any unaligned data word received during the third clock cycle in the internal buffer.

4. The gearbox of claim 3, wherein the internal buffer has a width of two words.

5. The gearbox of claim 4, wherein each word has a width of 32 bits.

6. The gearbox of claim 2, wherein the idle Ethernet Block has a length of 66 bits and the first aligned data word has a length of 32 bits.

7. The gearbox of claim 1, wherein the unaligned data word is received, at the first clock cycle, from a sampled word processor operatively connected to the gearbox.

8. The gearbox of claim 1, further comprising:
 an internal buffer;
 wherein the available data amount comprises data stored in the internal buffer and the unaligned data word.

9. The gearbox of claim 1, wherein at least a portion of the aligned data word comprises sync data.

10. The gearbox of claim 1, wherein the controller is implemented in an application-specific integrated circuit (ASIC).

11. The gearbox of claim 1, wherein the controller is implemented in a field programmable gate array (FPGA).

12. A system, comprising:
 a transmit port;
 a sampled word processor;
 a gearbox, interposed between the sample word processor and the transmit port, comprising circuitry and configured to:
  make a first determination that an available data amount at a first clock cycle is greater than a required data amount and that no idle Ethernet Block is being processed, wherein the available data amount at the first clock cycle comprises an unaligned data word, wherein the unaligned data word is received from the sampled word processor;
  based on the first determination, generate a first aligned data word comprising at least a portion of the unaligned data word; and
  transmit the first aligned data word to the transmit port.

13. The system of claim 12, further comprising:
 a receive port, wherein the receive port comprises circuitry and is configured to receive a stream of Ethernet Blocks and sample the stream of Ethernet Blocks to generate the unaligned data word.

14. The system of claim 12, wherein at least a portion of the aligned data word comprises sync data.

15. The system of claim 14, wherein the receive port, the gearbox, and the transmit port are implemented in a field programmable gate array (FPGA).

16. The system of claim 14, wherein the sampled word processor generates the unaligned data word by applying a function to, at least, the unaligned data word.

17. The system of claim 15, wherein the function is an aggregation function.

18. The system of claim 12, wherein the gearbox is further configured to:
 make a second determination that an available data amount at a second clock cycle is less than the required data amount; and
 based on the second determination, initiate transmission of an idle Ethernet Block.

19. The system of claim 12,
 wherein the gearbox further comprises an internal buffer; and
 wherein the gearbox is further configured to:
  make, at a third clock cycle, a third determination the idle Ethernet Block is being processed;
  make a fourth determination that a remaining amount of the idle Ethernet Block to process is greater than the required data amount; and
  based on the third and fourth determinations:
   transmit a second aligned data word consisting of: (i) idle Ethernet data or (ii) idle Ethernet data and sync data; and
   buffer any portion of any unaligned data word received during the third clock cycle in the internal buffer.

20. The system of claim 12, wherein the system is a network device.

* * * * *